G. W. CONROW.
ROLLER BEARING.
APPLICATION FILED MAR. 13, 1918.
1,301,389.
Patented Apr. 22, 1919.
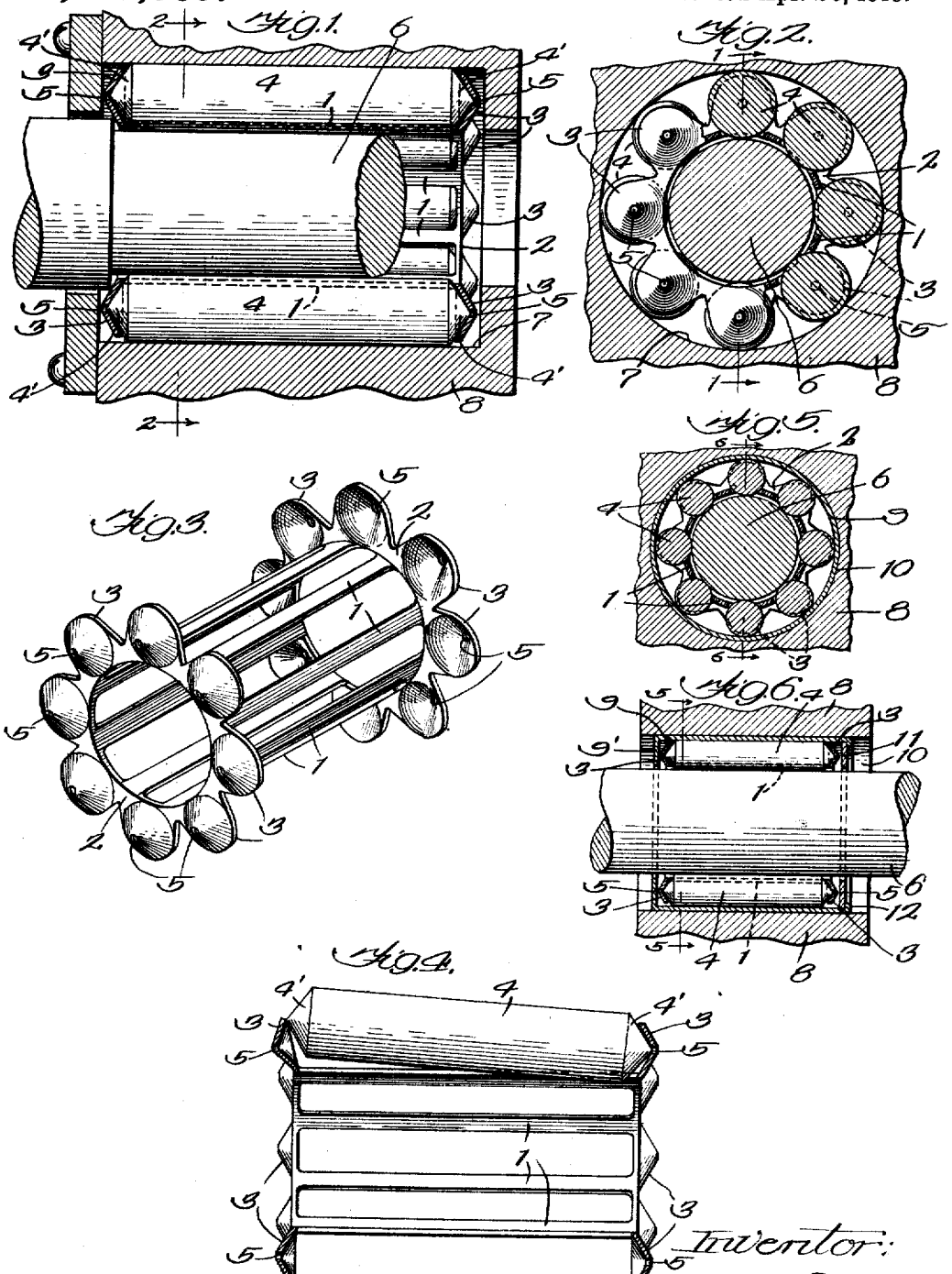
Inventor:
George W. Conrow.
By ... atty.

UNITED STATES PATENT OFFICE.

GEORGE W. CONROW, OF BROOKLYN, NEW YORK.

ROLLER-BEARING.

1,301,389.　　　　Specification of Letters Patent.　　　Patented Apr. 22, 1919.

Application filed March 13, 1918. Serial No. 222,074.

*To all whom it may concern:*

Be it known that I, GEORGE W. CONROW, citizen of the United States, residing at Brooklyn, in the county of Kings and State of New York, have invented a certain new and useful Improvement in Roller-Bearings, of which the following is a full, clear, concise, and exact description.

My invention relates to roller bearing structures and includes an improved formation of the cages by means of which bearing rollers are assembled. In accordance with one feature of my invention the roller assembling cage of a roller bearing structure is formed with flanges that are joined by ribs. The flanges and the bearing rollers have interengaging formations for assembling the flanges and the rollers while the ribs intervene between said bearing rollers. At least one of the flanges is formed in portions that are relatively movable across the general plane of such flange whereby rollers may be assembled with differing portions of this flange without disturbing the assembly of other rollers with such flange.

In the preferred embodiment of the invention each flange has roller engaging portions that are each individual to a roller and which portions are relatively movable transversely of the general planes of the flanges. In accordance with another feature of the invention the flanges are integrally formed with the ribs out of spring metal such as spring steel, a construction which moreover simplifies the manufacture of bearing roller cages and the assembly thereof with bearing rollers.

I will explain my invention more fully by reference to the accompanying drawing showing the preferred embodiment thereof and in which Figure 1 is a view taken on line 1—1 of Fig. 2; Fig. 2 is a view taken on line 2—2 of Fig. 1; Fig. 3 is a perspective view illustrating the preferred formation of a cylindrical cage for bearing rollers; Fig. 4 is a longitudinal sectional view of the cage shown in Fig. 3, this figure illustrating the manner of assembling bearing rollers with the cage; Fig. 5 is a view on line 5—5 of Fig. 6, illustrating some modification; and Fig. 6 is a view on line 6—6 of Fig. 5.

Like parts are indicated by similar characters of reference throughout the different figures.

The roller bearing structure illustrated is one which includes a cage that is cylindrical but it is obvious that the invention is not to be limited to any particular shape of the cage nor to the shape of the bearing rollers which, in the form of the invention illustrated, are also cylindrical with conical ends.

The ribs 1 are extended longitudinally of the bearing structure joining the flanges 2. As illustrated, the ribs are connected with the flanges at the inner circles of the flanges, to which construction I do not wish to be limited. The flanges and the ribs are desirably integrally formed of spring metal such as steel. Each flange preferably includes roller engaging portions 3 that are relatively movable transversely or across the general planes of the flanges, each of these portions 3 being capable of being flexed across its normal plane without disturbing its neighbors whereby each bearing roller 4 may be assembled with flanges between which it is to be interposed without disturbing the other rollers which may have been previously assembled with the flanges. The bearing rollers 4 that are illustrated have outwardly projecting conical ends $4^1$ on which account each of the roller engaging parts 3 of each flange are outwardly dished to correspond generally with the formation of the ends of the rollers. The rollers are desirably of such a length that they are loosely held but not dislodgeable without outwardly flexing the roller engaging flange parts 3. The roller engaging flange parts 3 are desirably provided with apertures 5 at their apices for the free accommodation of the apices of the bearing rollers and for the passage of lubricating oil if the rollers are to be immersed in lubricant.

In the preferred embodiment of the invention the ends of the ribs 1 terminate at the planes of the flanges whereby it is unnecessary to form the rollers with shouldered portions at their ends, it being possible for the rollers, throughout their cylindrical lengths, to project through the spaces between the ribs into engagement with the element which is to be supported by the bearing.

In each embodiment of the invention illustrated I have shown a shaft 6 which is engaged by the portions of the rollers 4 that inwardly project through the spaces between the ribs 1. The outward portions of the bearing rollers, in the construction shown in Figs. 1 and 2, engage the cylindrical wall 7 formed in the bearing box or pedestal 8. In the embodiment of the invention shown in Figs. 5 and 6, a housing 9 is disposed within the bore 10 of the bearing box or pedestal, the outer parts of the rollers engaging this housing instead of engaging the wall of the bore 10 directly. This housing has an inwardly projecting end wall 9¹ integrally formed therewith, there being a washer 11 held in place at the other end of the housing by means of the bead 12. The housing 9 is rigidly assembled with the bearing pedestal that incloses it whereby the general plane of bodily movement and individual rotation of the rollers is defined. In the construction illustrated in Figs. 1 and 2 and in the construction illustrated in Figs. 5 and 6 the cages and the bearing rollers assembled therewith are together capable of slight bodily movement longitudinally of the shaft 6.

While I have herein shown and particularly described the preferred embodiments of my invention I do not wish to be limited to the precise details of construction shown as changes may readily be made without departing from the spirit of my invention, but

Having thus described my invention I claim as new and desire to secure by Letters Patent the following:—

1. A roller bearing structure including a cage comprising ribs and flanges joined by the ribs; and bearing rollers between which said ribs are disposed, said flanges and the ends of said rollers having interengaging formations for assembling the flanges and rollers, at least one of said flanges having roller engaging portions that are each individual to a roller and are relatively movable across the general plane of such flange.

2. A roller bearing structure including a cage comprising ribs and flanges joined by the ribs; and bearing rollers between which said ribs are disposed, said flanges and the ends of said rollers having interengaging formations for assembling the flanges and rollers, at least one of said flanges being made of spring metal and having roller engaging portions that are each individual to a roller and are relatively movable across the general plane of such flange.

3. A roller bearing structure including a cage comprising ribs and flanges joined by and integrally formed with the ribs; and bearing rollers between which said ribs are disposed, said flanges and the ends of said rollers having interengaging formations for assembling the flanges and rollers, at least one of said flanges having roller engaging portions that are relatively movable across the general plane of such flange.

4. A roller bearing structure including a cage comprising ribs and flanges joined by and integrally formed with the ribs; and bearing rollers between which said ribs are disposed, said flanges and the ends of said rollers having interengaging formations for assembling the flanges and rollers, at least one of said flanges having roller engaging portions that are each individual to a roller and are relatively movable across the general plane of such flange.

5. A roller bearing structure including a cage comprising ribs and flanges joined by and integrally formed with the ribs of spring metal; and bearing rollers between which said ribs are disposed, said flanges and the ends of said rollers having interengaging formations for assembling the flanges and rollers, at least one of said flanges having roller engaging portions that are relatively movable across the general plane of such flange.

6. A roller bearing structure including a cage comprising ribs and flanges of spring metal joined by and integrally formed with the ribs; and bearing rollers between which said ribs are disposed, said flanges and the ends of said rollers having interengaging formations for assembling the flanges and rollers, at least one of said flanges having roller engaging portions that are each individual to a roller and are relatively movable across the general plane of such flange.

In witness whereof, I hereunto subscribe my name this 6th day of March, A. D., 1918.

GEORGE W. CONROW.

Copies of this patent may be obtained for five cents each, by addressing the "Commissioner of Patents, Washington, D. C."